Aug. 25, 1964  S. E. PROCTOR  3,145,576
UNIVERSAL JOINT FOR CHAIN LINKS
Filed June 14, 1961  2 Sheets-Sheet 1
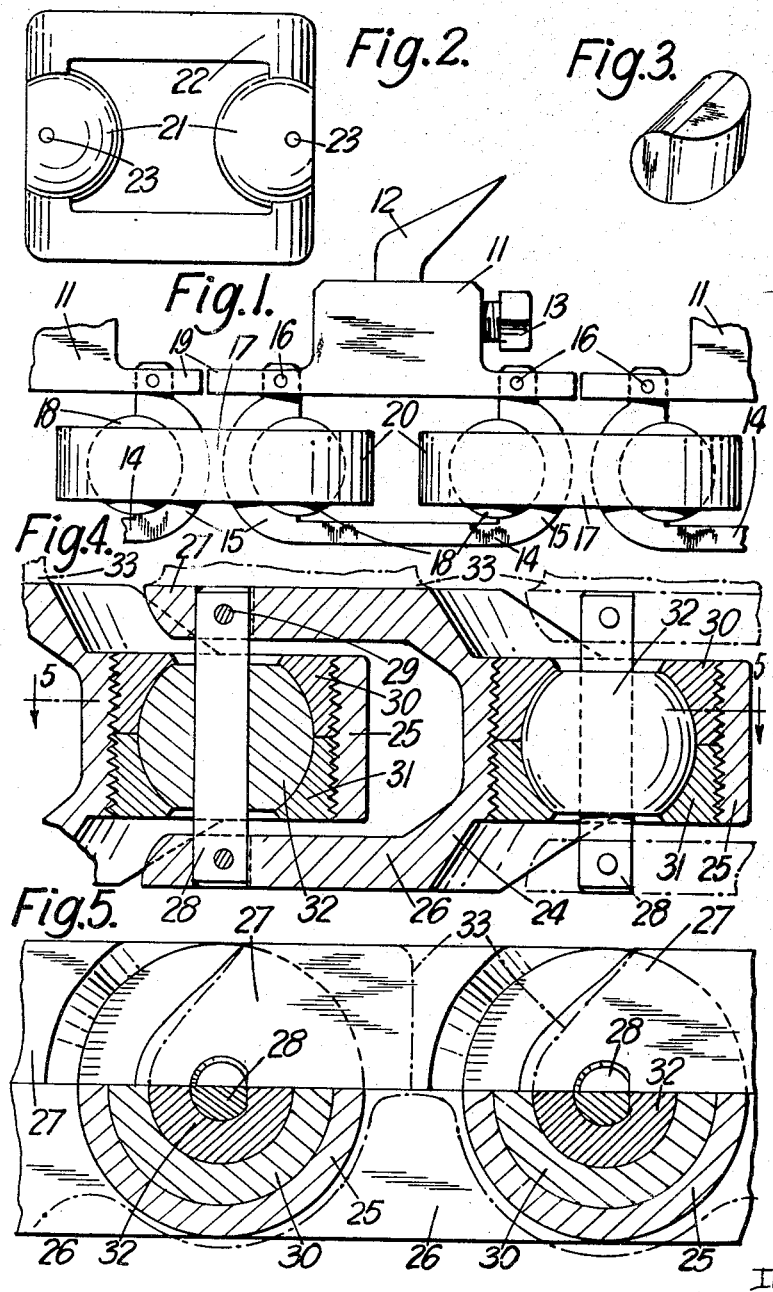
INVENTOR
Sidney E. Proctor
Watson, Cole, Grindle + Watson
ATTORNEYS

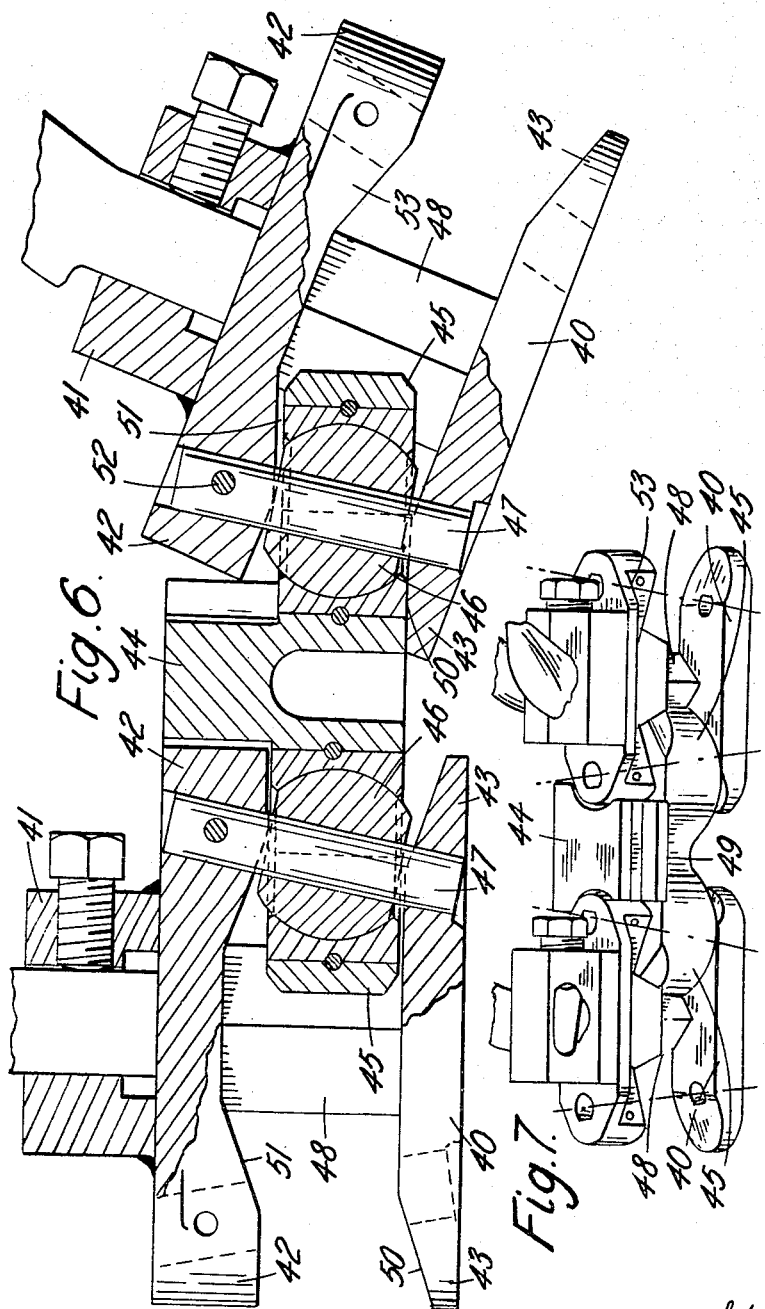

United States Patent Office 3,145,576
Patented Aug. 25, 1964

3,145,576
UNIVERSAL JOINT FOR CHAIN LINKS
Sidney Ernest Proctor, High Wycombe, England, assignor to Austin Hoy and Company Limited, High Wycombe, England, a British company
Filed June 14, 1961, Ser. No. 117,237
Claims priority, application Great Britain June 14, 1960
1 Claim. (Cl. 74—246)

This invention comprises improvements in or relating to coal-cutter chains.

The invention relates to the kind of coal-cutter chain having joints between the links which enable the chain to bend in two dimensions. Chains are known in which the capacity to do this is afforded by ball joints; in others by a universal joint. It is an object of the present invention to provide a form of joint which gives ample freedom of movement combined with good bearing surface area for a given size.

The present invention comprises a coal cutter chain with ball-jointed links or like joints with rounded bearing surfaces characterised by the fact that at each joint both links have ball-engaging portions which engage the ball from both sides but in planes (parallel to the length of the chain) which cross one another.

In one form according to the invention alternate links carry pick-boxes with U-shaped underparts each adapted to fit in a plane passing through the centre lines of the pick-boxes round two spaced rounded bearing elements and between these alternate links are connecting links which consist of elongated loops passing round the said bearing elements in a plane at right angles to that of said underparts.

The balls may be distinct elements, separated from the links and inserted between them. In another embodiment of the invention balls are recessed to receive part of the elongated loops and are secured thereto.

Conveniently the elongated loops are in one piece and the U-shaped underparts of the alternate links are detachable from the pick-boxes for the purpose of assembling the chain.

In another type of chain according to the invention at each joint one of the links engages a spherical ball as a bearing element, by means of a stem passing through the ball and projecting at both sides of its diameter the link being divided and the two divided parts engaging the two ends of the stem, while the other link of the joint passes round the ball in a plane transverse to the stem. Preferably the link which passes round the ball is fitted with socket members to engage the ball.

In one embodiment of coal-cutter chain of this type each link is forked at one end to engage a ball-stem and at the other end is formed to pass around the next ball in a plane transverse to the plane of said stem.

In another embodiment, alternate links carry pick-boxes and are forked at both ends to engage ball stems, while intermediate links are provided which at both ends pass round the balls in a plane transverse to the stems.

The following is a description by way of example of certain of the embodiments in accordance with the invention, reference being made to the accompanying drawings in which:

FIGURE 1 is a side elevation of a coal-cutter chain,
FIGURE 2 is a plan of an alternative type of link for use in connection with the chain such as shown in FIGURE 1,
FIGURE 3 shows a modified form of bearing element,
FIGURE 4 is a vertical section through another type of coal-cutter chain according to the invention,
FIGURE 5 is a plan of the same,
FIGURE 6 is a vertical section through a further alternative construction, and
FIGURE 7 is a perspective view of the construction shown in FIGURE 6.

In the construction shown in FIGURE 1, alternate links of the coal-cutter chain comprise pick-carrying bosses 11 having bores into which are entered the shanks of cutter-picks 12; set-screws 13 secure the cutter picks in the bosses. Suspended from the pick-carrying bosses are U-shaped underparts 14 which are detachable from the bosses and secured by rivets 16. The legs of the U-shaped members are bowed as shown at 15 and formed with part-spherical inner surfaces. The links are joined to one another by intermediate open-centred links 17 in the form of elongated one-piece loops of metal which each embrace one leg of each of two adjacent U-shaped underparts 14. The elongated loop links 17 at each end are formed with a part-spherical inner surface.

Between the spherical inner surfaces of each of the links 17 and of the corresponding U-shaped underpart 15 there is inserted a spherical ball 18 which is a distinct member from the links and for which the spherical inner surfaces of the links form a seating. In assembling the chain the ball is inserted before the U-shaped underpart 14 is secured to the two pick-carrying bosses 11. Each pick-carrying boss is extended towards the adjacent pick-carrying bosses as shown at 19 so as to limit the play between the links. In this way the balls are retained and the chain is prevented from collapsing. The U-shaped members 14 and the elongated links 17 may be of rectangular cross-section and may be provided with guide ribs along their sides (not shown) for co-operation with a guiding jib-track. The teeth of a driving sprocket may be arranged to enter between the curved outer surfaces 15 of adjacent U-shaped members, so that the cutter-picks extend in the plane of the sprocket as is usual in a conventional coal cutter, or they may be arranged to enter between the curved outer surfaces 20 of the ends adjacent elongated links 17 thus allowing the chain to be used as a side-cutting chain wherein the cutter-picks extend in a plane at right angles to the driving sprocket.

In the alternative construction indicated in FIGURE 2 links comprising a pick-carrying boss 11 and a U-shaped member 14 are as shown in FIGURE 1. However the spherical balls 18 are replaced by fixed spherical balls 21 which are recessed at one side and are rigidly secured to the ends of the elongated links 22, for example by rivetting as shown at 23. The chain is assembled as before with the links 22 taking the place of links 20 and the spherical balls 21 seated in the part-spherical inner surfaces of the U-shaped members 14.

It is to be understood that the part-spherical seatings in the links 14, 17 or 22 for the balls 18 or 21 may be provided with replaceable liners. Instead of having spherical balls between the links it is possible to use other suitable rounded shapes of bearing elements. For example, the bearing elements may each be made of two half-cylinders, each with a flat side in which the axis of the semi-cylindrical surface lies, the said two flat faces being united together, as shown in FIGURE 3.

Referring now to FIGURES 4 and 5, these show a chain in which the links are hermaphroditic. The body part of each link consists of a forging 24 which comprises a large eye 25 at one end with an aperture through it in a vertical plane as shown in the drawing and two fork arms 26, 27, integral with the eye 25 and the roots of which spring from the eye and extend away from it parallel with one another and parallel with the top and bottom faces of the eye. Externally, the eye is cylindrical as shown in the bottom portion of FIGURE 5 which is drawn in section.

The fork arms 26, 27 of each link are spaced apart a little wider than the thickness of the eye 25 of the next link so as to leave a gap adequate for bending of the chain and there extends between them a ball-stem 28 which passes through holes drilled in the fork arms and is secured in place by rivets 29.

The eyes 25 are screw-threaded internally and hardened socket liners 30, 31 are screwed into them. The two liners 30, 31 form two halves of a spherical bearing for a ball 32. The stems 28 are preferably non-circular in section and the balls have holes broached to fit, so that they cannot turn on the stems.

The links can be assembled into a chain by screwing the socket liners in place around the balls and then threading the ball-stems through the holes in the fork arms and balls and finally inserting the rivets 29.

Cutter boxes 33 can either be forged solid with the bodies of the links 24, or welded on. The cutter box may either keep the position shown in FIGURE 4 or it may be welded on the side of the fork arms 26, 27 so as to bridge the spaces between them.

The length of the fork arms determines the pitch of the links and is made such that the space between adjacent eyes 25 is suitable to fit the teeth of the sprocket by which the chain is to be driven.

Referring now to FIGURES 6 and 7, these show links of a chain in which alternate links 40 carry pick-boxes 41 and are provided with fork arms 42, 43 at both ends. Intermediate links 44 are provided which at both ends are formed with eyes 45 which pass round balls 46. The balls 46 have non-circular stems 47 which pass diametrically through them and through holes in the ends of the fork arms 42, 43. The stems are sloped to a degree equivalent to about half the maximum expected angle of bending of the joint. The joints are similar to the joints shown in FIGURES 4 and 5 but the links are not hermaphroditic. Also, the liners for the ball sockets are not screwed but are held in by tangential rivets. They are divided longitudinally. The top and bottom fork arms 42, 43 are spaced apart by triangular post portions of the links 48 which are integral with them and are located as can be seen in FIGURE 7 towards one side of the link. The ends of the links 44 which they form the eyes 45 are cylindrical and there is a deep recess 49 between them to receive the teeth of a driving sprocket. The teeth of the sprocket can also engage the exterior of the eyes 45 if the pitch of the intermediate links 44 are made equal to that of the pick carrying links 40.

In order to permit the chain to bend freely in both dimensions without allowing much space between the fork arms where the stems 47 pass through them, the ends of the fork arms 43 are bevelled off as shown at 50 and of the fork arms 42 are beveled off as shown at 51. This permits bending of the chain in a plane parallel with stems 47 and with the length of the chain, as can be seen at the right-hand side of FIGURE 6 as well as bending around the axis of the stems 47. It will be appreciated that the near approach thus provided between the surfaces of the links which face one another, enables twisting of the chain to be effectively resisted. It will be noted that to facilitate insertion of rivets 52 for holding the stems 47 the upper fork arms 42 are undercut as shown at 53.

I claim:

In a coal cutter chain the combination of a first link, a second link and a joint between said first and second links comprising a part spherical socket near an end of said first link, two fork arms spaced apart extending from said second link, a stem extending laterally between said fork arms, inclined to the normal therebetween and extending through said part spherical socket, a ball member on said stem between said fork arms and within said socket, said first link near said socket extending laterally, said fork arms extending laterally to engage both sides of said first link where it extends laterally so as to prevent relative twisting of the links, said fork arms being bevelled to permit relative bending of said links in a longitudinal plane through said stem as well as relative bending about said stem.

References Cited in the file of this patent
UNITED STATES PATENTS

| | | |
|---|---|---|
| 645,202 | Carter | Mar. 13, 1900 |
| 1,869,050 | Coppage | July 26, 1932 |
| 1,956,298 | Paulson | Apr. 24, 1934 |
| 1,965,285 | Gilstad | July 3, 1934 |
| 1,996,586 | Meyer | Apr. 6, 1935 |
| 2,733,905 | Proctor | Feb. 7, 1956 |